US012525160B2

(12) United States Patent
Chun et al.

(10) Patent No.: US 12,525,160 B2
(45) Date of Patent: Jan. 13, 2026

(54) ELECTROLUMINESCENT DISPLAY APPARATUS

(71) Applicant: LG Display Co., Ltd., Seoul (KR)

(72) Inventors: Min Kyu Chun, Paju-si (KR); Jeong Hyeon Choi, Paju-si (KR); Young Jun Choi, Paju-si (KR); Sang Won Yoon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/974,208

(22) Filed: Dec. 9, 2024

(65) Prior Publication Data

US 2025/0265954 A1 Aug. 21, 2025

(30) Foreign Application Priority Data

Feb. 19, 2024 (KR) ........................ 10-2024-0023444

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2300/0842* (2013.01); *G09G 2310/08* (2013.01); *G09G 2320/045* (2013.01); *G09G 2330/10* (2013.01); *G09G 2330/12* (2013.01)

(58) Field of Classification Search
CPC ........... G09G 3/006; G09G 3/30–3291; G09G 2300/0842; G09G 2310/08; G09G 2320/045; G09G 2330/10; G09G 2330/12
See application file for complete search history.

(56) References Cited

U.S. PATENT DOCUMENTS

| | | | | |
|---|---|---|---|---|
| 2016/0351096 A1* | 12/2016 | Tani | ..................... | G09G 3/3233 |
| 2017/0352305 A1* | 12/2017 | Chang | .................. | G09G 3/2085 |
| 2023/0057284 A1* | 2/2023 | Jang | ......................... | G09G 3/32 |

* cited by examiner

*Primary Examiner* — Hang Lin
(74) *Attorney, Agent, or Firm* — Morgan, Lewis & Bockius LLP

(57) ABSTRACT

An electroluminescent display apparatus includes: a first subpixel circuit including a first driving element including a gate electrode connected to a first node and a source electrode connected to a second node, a first light emitting device connected to the second node, a first switch element connecting the first node to a first data line charged with a detection data voltage according to a scan signal, a second switch element connected to the second node at one electrode thereof and turned on based on the scan signal, and a first monitoring element connecting a readout line to the other electrode of the second switch element according to a first monitoring signal; and a gate driver configured to supply the scan signal to gate electrodes of the first and second switch elements and supply the first monitoring signal to a gate electrode of the first monitoring element.

7 Claims, 8 Drawing Sheets

ELECTROLUMINESCENT DISPLAY APPARATUS

CROSS-REFERENCE TO RELATED APPLICATION

This application claims the benefit of and priority to Korean Patent Application No. 10-2024-0023444, filed on Feb. 19, 2024, which is hereby incorporated by reference as if fully set forth herein.

BACKGROUND

Field

The present disclosure relates to an electroluminescent display apparatus and, more particularly to, an electroluminescent display apparatus capable of detecting a leakage defect.

Discussion of the Related Art

Each subpixel of electroluminescent display apparatuses includes a driving element which generates a driving current and a light emitting device which emits light with the driving current, and moreover, controls the amount of light emitted from the light emitting device to implement luminance.

When a driving element is degraded as a driving time elapses, the display quality of a black image may be reduced due to a leakage current occurring in the driving element. In the relate art, because there is no method which detects the leakage of the driving element, it is difficult to determine whether an abnormal detection value of a subpixel is caused by the leakage of the driving element or another defect (or short circuit or an open defect).

SUMMARY

To overcome the aforementioned problem of the related art, the present disclosure may provide an electroluminescent display apparatus which may detect the leakage of a driving element included in each subpixel.

To achieve these objects and other advantages and in accordance with the purpose of the disclosure, as embodied and broadly described herein, an electroluminescent display apparatus includes a first subpixel circuit including a first driving element including a gate electrode connected to a first node and a source electrode connected to a second node, a first light emitting device connected to the second node, a first switch element connecting the first node to a first data line charged with a detection data voltage according to a scan signal, a second switch element connected to the second node at one electrode thereof and turned on based on the scan signal, and a first monitoring element connecting a readout line to the other electrode of the second switch element according to a first monitoring signal, a gate driver configured to supply the scan signal to a gate line connected to gate electrodes of the first and second switch elements and supply the first monitoring signal to a first monitoring line connected to a gate electrode of the first monitoring element, and a sensing circuit configured to sense a voltage of the readout line in a first detection period where the first and second switch elements and the first monitoring element are turned on.

Additional features and aspects of the disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures.

BRIEF DESCRIPTION OF THE DRAWINGS

The accompanying drawings, which are included to provide a further understanding of the disclosure and are incorporated in and constitute a part of this application, illustrate example embodiment(s) of the disclosure and together with the description serve to explain the principle of the disclosure. In the drawings.

DETAILED DESCRIPTION

Figure 1:
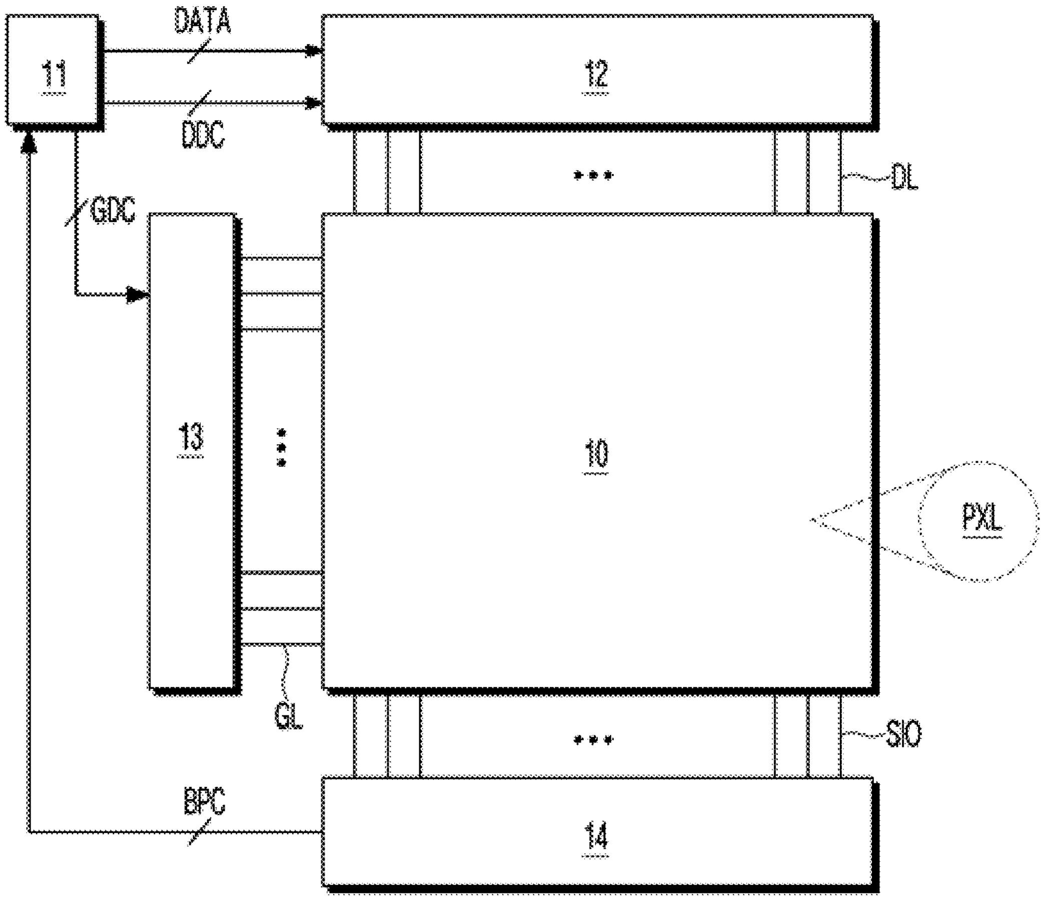
FIG. 1 is a diagram illustrating an electroluminescent display apparatus according to an example embodiment of the present disclosure.

Hereinafter, example embodiments of the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

FIG. 1 is a diagram illustrating an electroluminescent display apparatus according to the present embodiment.

As shown in FIG. 1, the electroluminescent display apparatus according to the present embodiment may include a display panel 10, a timing controller 11, a data driver 12, a gate drive 13, and a sensing circuit 14.

In a screen of the display panel 10, data lines DL extending in a column direction (or a vertical direction) may intersect with gate lines GL extending in a row direction (or a horizontal direction), and a plurality of unit pixels PXL may be respectively provided in a plurality of intersection areas and may be arranged as a matrix type to configure a pixel array. Each data line DL may be connected to subpixels adjacent thereto in the column direction in common, and each gate line GL may be connected to a plurality of unit pixels PXL adjacent thereto in the row direction in common.

Each unit pixel PXL may include a plurality of subpixels. The plurality of subpixels may configure one unit pixel PXL to implement various color combinations. To simplify the pixel array, four subpixels configuring the same unit pixel PXL may share the same readout line SIO and gate line GL. Also, four subpixels configuring the same unit pixel PXL may be individually connected to different monitoring lines.

When a driving element of each subpixel is degraded, a leakage current may flow in a corresponding driving element in an open state. The readout line SIO may be used to detect whether the leakage of the driving element included in each subpixel occurs. In the pixel array, the readout lines SIO may be arranged in the row direction parallel to the data line DL, but the present embodiment is not limited thereto.

The timing controller 11 may receive a timing signal such as a vertical synchronization signal Vsync, a horizontal synchronization signal Hsync, a data enable signal DE, and a dot clock DCLK from a host system and may control an operation timing of each of the data driver 12 and the gate driver 13. The timing controller 11 may generate a gate timing control signal GDC for controlling an operation of the gate driver 13 and a data timing control signal DDC for controlling an operation of the data driver 12.

The timing controller 11 may receive video data DATA from the host system and may receive a leakage current detection signal BPC corresponding to each subpixel from the sensing circuit 14. The timing controller 11 may compare the leakage current detection signal BPC with a predetermined reference value to determine whether a defect of each subpixel occurs. The timing controller 11 may perform a partial or entire dark spot processing on a unit pixel PXL including a defective subpixel. When at least one of subpixels configuring one unit pixel PXL is defective, the one unit pixel PXL may be determined to be defective. The partial dark spot processing may be an operation of converting only one piece of image data DATA, which is to be written in a defective subpixel, into black grayscale data, and the entire dark spot processing may be an operation of converting all image data DATA, which are to be written in one defective unit pixel PXL, into black grayscale data. The timing controller 11 may supply the data driver 12 with image data DATA including black grayscale data for dark spot processing.

The timing controller 11 may temporally divide display driving and leakage current detection driving, based on the timing control signals DDC and GDC. The display driving may be for displaying image data DATA including black grayscale data on a screen. The leakage current detection driving may be for detecting a defective pixel PXL and partially or entirely blackening the detected defective pixel PXL.

The leakage current detection driving may be performed for a time for which the display driving is not performed. For example, the leakage current detection driving may be performed in a power on period until before screen reproduction starts after a system main power is applied, or may be performed in a power off period until before the system main power is released after the screen reproduction ends.

The data driver 12 may be connected to the subpixels through the data lines DL. The data driver 12 may generate data voltages needed for the display driving or leakage current detection driving of the subpixels and may supply the data voltages to the data lines DL, based on the data timing control signal DDC. A display data voltage may be obtained as a result of digital-analog conversion on the image data DATA, and to this end, the data driver 12 may include a plurality of digital-to-analog converters (DACs). The leakage current detection driving may be an operation of detecting a leakage current flowing in the driving element in a state where the driving element is turned off. Accordingly, a detection data voltage may be a data voltage for turning off the driving element included in each subpixel.

The data driver 12 may be configured with a plurality of source driving integrated circuits (ICs). Each of the source driving ICs may include a shift register, a latch, the DACs, and an output buffer. Each of the source driving ICs may further include a separate circuit for generating the detection data voltage.

The gate driver 13 may be connected to the subpixels through the gate lines GL and the monitoring lines. The gate driver 13 may generate scan signals, based on the gate timing control signal GDC, and may supply the scan signals to the gate lines 15, based on a supply timing of a data voltage. A pixel row to which a data voltage is to be supplied may be selected by the scan signal.

The gate driver 13 may generate a scan signal for display driving and may supply the scan signal to the gate lines 15, based on a supply timing of a display data voltage. The gate driver 13 may generate a scan signal for leakage current detection driving and may supply the scan signal to the gate lines 15, based on a supply timing of a detection data voltage.

The gate driver 13 may further generate monitoring signals for leakage current detection driving and may supply the monitoring signals to the monitoring lines in detection sequence.

The gate driver 13 may be configured with a plurality of gate drive ICs each including a gate shift register, a level shifter, and an output buffer. Alternatively, the gate driver 13 may be formed directly on a substrate of the display panel 10 by using a gate driver in panel (GIP) type. In the GIP type, the level shifter may be mounted on a control printed circuit board (PCB), and the gate shift register may be provided in a bezel region which is a non-display area of the display panel 10. The gate shift register may include a plurality of output stages (hereinafter referred to as GIP elements) which are connected to each other in cascade. The GIP elements may be connected to the gate lines GL and may output the scan signals to the gate lines GL. The GIP elements may be further connected to the monitoring lines and may output the monitoring signals to the monitoring lines.

The sensing circuit 14 may be connected to the unit pixels PXL of the display panel 10 through the readout lines SIO. In leakage current detection driving, the sensing circuit 14 may detect a voltage of a readout line SIO changed by a leakage current of each subpixel and may convert a detected voltage value into a digital signal to generate a leakage current detection signal BPC. Also, the sensing circuit 14 may transfer the leakage current detection signal BPC to the timing controller 11.

FIGS. 2A to 2D are diagrams illustrating a circuit configuration of four subpixels included in one unit pixel according to the present embodiment.

Figure 2A:
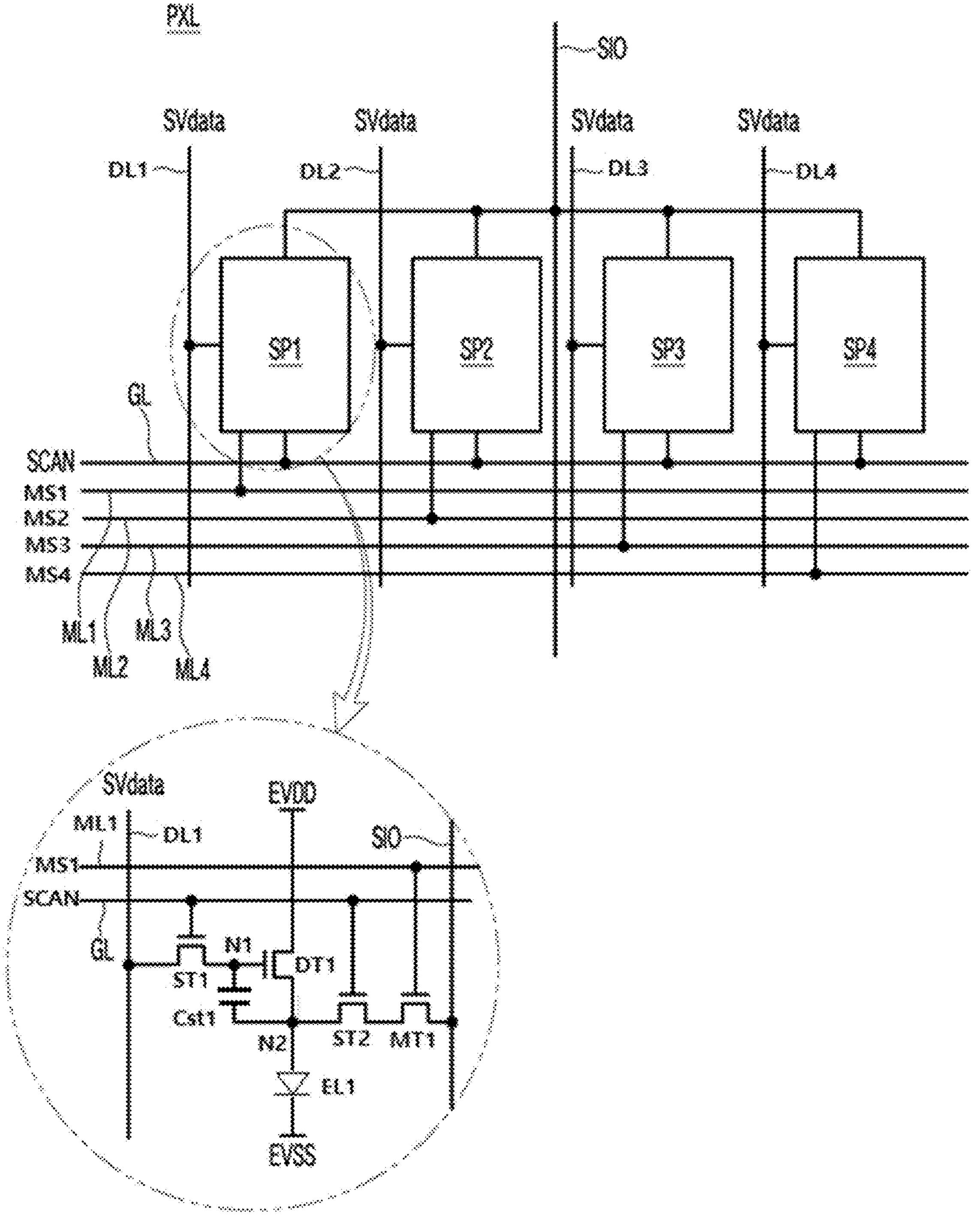
FIGS. 2A to 2D are diagrams illustrating a circuit configuration of four subpixels included in one unit pixel according to an example embodiment of the present disclosure.

As shown in FIG. 2A, a unit pixel PXL may include four subpixels (for example, first to fourth subpixels) SP1 to SP4 which share a readout line SIO. The four subpixels SP1 to SP4 may include red (R), green (G), blue (B), and white (W) subpixels.

As shown in FIG. 2A, the first subpixel SP1 may include a first light emitting device EL1, a first driving element DT1, first and second switch elements ST1 and ST2, a first monitoring element MT1, and a first storage capacitor Cst1.

The first light emitting device EL1 may emit light in only display driving and may not emit light in leakage current detection driving. The first light emitting device EL1 may be implemented as an organic light emitting diode including an organic emission layer, or may be implemented as an inorganic light emitting diode including an inorganic emission layer. An anode electrode of the first light emitting device EL1 may be connected to a second node N2, and a cathode electrode thereof may be connected to an input terminal of a low level driving voltage EVSS.

In display driving, the first driving element DT1 may generate a display driving current and may supply the display driving current to the first light emitting device EL1. In leakage current detection driving, the first driving element DT1 may be off-driven by a detection data voltage SVdata having an off level. When the first driving element DT1 is normal without a leakage defect, a leakage current may not flow in the first driving element DT1. However, when a leakage defect occurs in the first driving element DT1, a leakage current may flow in the first driving element DT1 which is off-driven.

A gate electrode of the first driving element DT1 may be connected to a first node N1, a drain electrode thereof may be connected to an input terminal of a high level driving voltage EVDD, and a source electrode thereof may be connected to the second node N2.

The first and second switch elements ST1 and ST2 may be simultaneously turned on or off by the same scan signal SCAN in display driving or leakage current detection driving. The first switch element ST1 may be connected between a first data line DL1 and the first node N1 and may be turned on based on the scan signal SCAN from a gate line GL. When the first switch element ST1 is turned on, the detection data voltage SVdata or the display data voltage may be applied to the first node N1. A gate electrode of the first switch element ST1 may be connected to the gate line GL, a drain electrode thereof may be connected to the first data line DL1, and a source electrode thereof may be connected to the first node N1.

The second switch element ST2 may be connected between the readout line SIO and the second node N2 and may be turned on based on the scan signal SCAN from the gate line GL. In programming for display driving, the second switch element ST2 may be turned on and may apply a reference voltage charged into the readout line SIO to the second node N2. In leakage current detection driving, the second switch element ST2 may be turned on and may vary a voltage of the readout line SIO by a voltage of the second node N2 based on a leakage current. A gate electrode of the second switch element ST2 may be connected to the gate line GL, a drain electrode thereof may be connected to the second node N2, and a source electrode thereof may be connected to a drain electrode of the first monitoring element MT1.

The first monitoring element MT1 may connect the source electrode of the second switching element ST2 to the readout line SIO, based on a first monitoring signal MS1. The first subpixel SP1 may be exclusively connected to the readout line SIO by the first monitoring element MT1, and thus, the leakage of the first driving element DT1 may be accurately detected.

A gate electrode of the first monitoring element MT1 may be connected to a first monitoring line ML1, a drain electrode thereof may be connected to the source electrode of the second switch element ST2, and a source electrode thereof may be connected to the readout line SIO.

The first storage capacitor Cst1 may be connected between the first node N1 and the second node N2 and may store a gate-source voltage of the first driving element DT1.

Figure 2B:
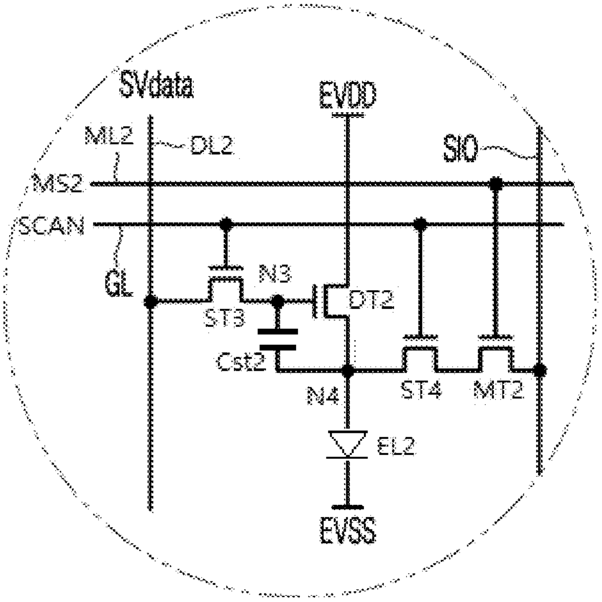

As shown in FIG. 2B, the second subpixel SP2 may include a second light emitting device EL2, a second driving element DT2, third and fourth switch elements ST3 and ST4, a second monitoring element MT2, and a second storage capacitor Cst2.

The second light emitting device EL2 may emit light in only display driving and may not emit light in leakage current detection driving. The second light emitting device EL2 may be implemented as an organic light emitting diode including an organic emission layer, or may be implemented as an inorganic light emitting diode including an inorganic emission layer. An anode electrode of the second light emitting device EL2 may be connected to a fourth node N4, and a cathode electrode thereof may be connected to the input terminal of the low level driving voltage EVSS.

In display driving, the second driving element DT2 may generate a display driving current and may supply the display driving current to the second light emitting device EL2. In leakage current detection driving, the second driving element DT2 may be off-driven by the detection data voltage SVdata having an off level. When the second driving element DT2 is normal without a leakage defect, a leakage current may not flow in the second driving element DT2. However, when a leakage defect occurs in the second driving element DT2, a leakage current may flow in the second driving element DT2 which is off-driven.

A gate electrode of the second driving element DT2 may be connected to a third node N3, a drain electrode thereof may be connected to the input terminal of the high level driving voltage EVDD, and a source electrode thereof may be connected to the fourth node N4.

The third and fourth switch elements ST3 and ST4 may be simultaneously turned on or off by the same scan signal SCAN in display driving or leakage current detection driving. The third switch element ST3 may be connected between a second data line DL2 and the third node N3 and may be turned on based on the scan signal SCAN from the gate line GL. When the third switch element ST3 is turned on, the detection data voltage SVdata or the display data voltage may be applied to the third node N3. A gate electrode of the third switch element ST3 may be connected to the gate line GL, a drain electrode thereof may be connected to the second data line DL2, and a source electrode thereof may be connected to the third node N3.

The fourth switch element ST4 may be connected between the readout line SIO and the fourth node N4 and may be turned on based on the scan signal SCAN from the gate line GL. In programming for display driving, the fourth switch element ST4 may be turned on and may apply the reference voltage charged into the readout line SIO to the fourth node N4. In leakage current detection driving, the fourth switch element ST4 may be turned on and may vary a voltage of the readout line SIO by a voltage of the fourth node N4 based on a leakage current. A gate electrode of the fourth switch element ST4 may be connected to the gate line GL, a drain electrode thereof may be connected to the fourth node N4, and a source electrode thereof may be connected to a drain electrode of the second monitoring element MT2.

The second monitoring element MT2 may connect the source electrode of the fourth switching element ST4 to the readout line SIO, based on a second monitoring signal MS2. The second subpixel SP2 may be exclusively connected to the readout line SIO by the second monitoring element MT2, and thus, the leakage of the second driving element DT2 may be accurately detected.

A gate electrode of the second monitoring element MT2 may be connected to a second monitoring line ML2, a drain electrode thereof may be connected to the source electrode of the fourth switch element ST4, and a source electrode thereof may be connected to the readout line SIO.

The second storage capacitor Cst2 may be connected between the third node N3 and the second node N4 and may store a gate-source voltage of the second driving element DT2.

Figure 2C:
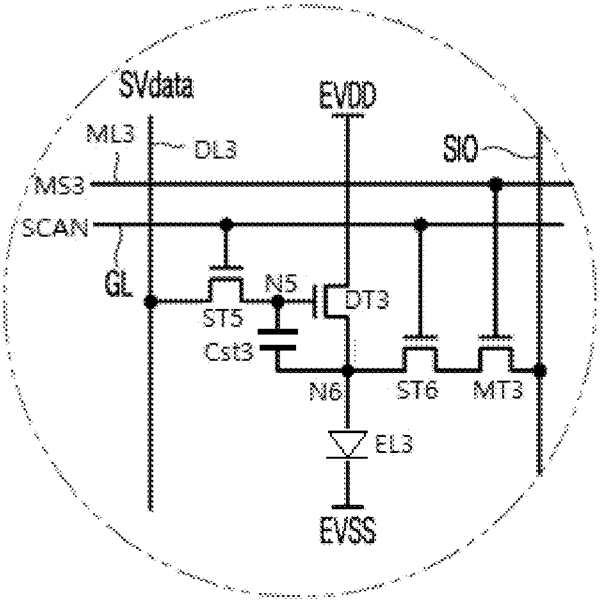

As shown in FIG. 2C, the third subpixel SP3 may include a third light emitting device EL3, a third driving element DT3, fifth and sixth switch elements ST5 and ST6, a third monitoring element MT3, and a third storage capacitor Cst3.

The third light emitting device EL3 may emit light in only display driving and may not emit light in leakage current detection driving. The third light emitting device EL3 may be implemented as an organic light emitting diode including an organic emission layer, or may be implemented as an inorganic light emitting diode including an inorganic emission layer. An anode electrode of the third light emitting device EL3 may be connected to a sixth node N6, and a cathode electrode thereof may be connected to the input terminal of the low level driving voltage EVSS.

In display driving, the third driving element DT3 may generate a display driving current and may supply the display driving current to the third light emitting device EL3. In leakage current detection driving, the third driving element DT3 may be off-driven by the detection data voltage SVdata having an off level. When the third driving element DT3 is normal without a leakage defect, a leakage current may not flow in the third driving element DT3. However, when a leakage defect occurs in the third driving element DT3, a leakage current may flow in the third driving element DT3 which is off-driven.

A gate electrode of the third driving element DT3 may be connected to a fifth node N5, a drain electrode thereof may be connected to the input terminal of the high level driving voltage EVDD, and a source electrode thereof may be connected to the sixth node N6.

The fifth and sixth switch elements ST5 and ST6 may be simultaneously turned on or off by the same scan signal SCAN in display driving or leakage current detection driving. The fifth switch element ST5 may be connected between a third data line DL3 and the fifth node N5 and may be turned on based on the scan signal SCAN from the gate line GL. When the fifth switch element ST5 is turned on, the detection data voltage SVdata or the display data voltage may be applied to the fifth node N5. A gate electrode of the fifth switch element ST5 may be connected to the gate line GL, a drain electrode thereof may be connected to the third data line DL3, and a source electrode thereof may be connected to the fifth node N5.

The sixth switch element ST6 may be connected between the readout line SIO and the sixth node N6 and may be turned on based on the scan signal SCAN from the gate line GL. In programming for display driving, the sixth switch element ST6 may be turned on and may apply the reference voltage charged into the readout line SIO to the sixth node N6. In leakage current detection driving, the sixth switch element ST6 may be turned on and may vary a voltage of the readout line SIO by a voltage of the sixth node N6 based on a leakage current. A gate electrode of the sixth switch element ST6 may be connected to the gate line GL, a drain electrode thereof may be connected to the sixth node N6, and a source electrode thereof may be connected to a drain electrode of the third monitoring element MT3.

The third monitoring element MT3 may connect the source electrode of the sixth switching element ST6 to the readout line SIO, based on a third monitoring signal MS3. The third subpixel SP3 may be exclusively connected to the readout line SIO by the third monitoring element MT3, and thus, the leakage of the third driving element DT3 may be accurately detected.

A gate electrode of the third monitoring element MT3 may be connected to a third monitoring line ML3, a drain electrode thereof may be connected to the source electrode of the sixth switch element ST6, and a source electrode thereof may be connected to the readout line SIO.

The third storage capacitor Cst3 may be connected between the fifth node N5 and the sixth node N6 and may store a gate-source voltage of the third driving element DT3.

Figure 2D:
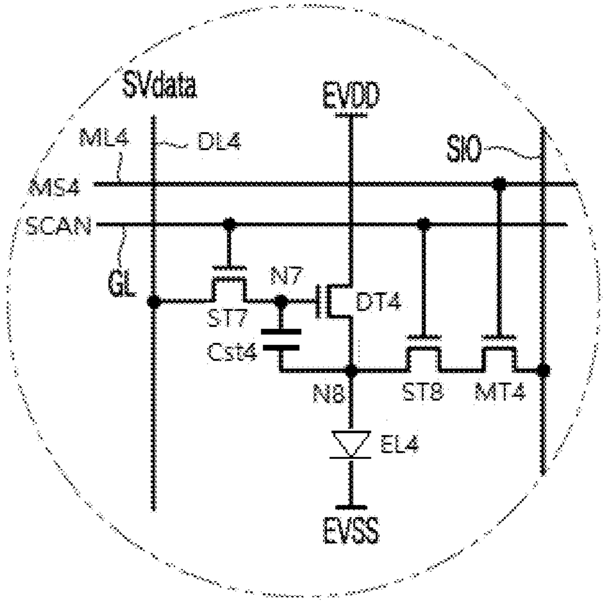

As shown in FIG. 2D, the fourth subpixel SP4 may include a fourth light emitting device EL4, a fourth driving element DT4, seventh and eighth switch elements ST7 and ST8, a fourth monitoring element MT4, and a fourth storage capacitor Cst4.

The fourth light emitting device EL4 may emit light in only display driving and may not emit light in leakage current detection driving. The fourth light emitting device EL4 may be implemented as an organic light emitting diode including an organic emission layer, or may be implemented as an inorganic light emitting diode including an inorganic emission layer. An anode electrode of the fourth light emitting device EL4 may be connected to an eighth node N8, and a cathode electrode thereof may be connected to the input terminal of the low level driving voltage EVSS.

In display driving, the fourth driving element DT4 may generate a display driving current and may supply the display driving current to the fourth light emitting device EL4. In leakage current detection driving, the fourth driving element DT4 may be off-driven by the detection data voltage SVdata having an off level. When the fourth driving element DT4 is normal without a leakage defect, a leakage current may not flow in the fourth driving element DT4. However, when a leakage defect occurs in the fourth driving element DT4, a leakage current may flow in the fourth driving element DT4 which is off-driven.

A gate electrode of the fourth driving element DT4 may be connected to a seventh node N7, a drain electrode thereof may be connected to the input terminal of the high level driving voltage EVDD, and a source electrode thereof may be connected to the eighth node N8.

The seventh and eighth switch elements ST7 and ST8 may be simultaneously turned on or off by the same scan signal SCAN in display driving or leakage current detection driving. The seventh switch element ST7 may be connected between the third data line DL3 and the seventh node N7 and may be turned on based on the scan signal SCAN from the gate line GL. When the seventh switch element ST7 is turned on, the detection data voltage SVdata or the display data voltage may be applied to the seventh node N7. A gate electrode of the seventh switch element ST7 may be connected to the gate line GL, a drain electrode thereof may be connected to the third data line DL3, and a source electrode thereof may be connected to the seventh node N7.

The eighth switch element ST8 may be connected between the readout line SIO and the eighth node N8 and may be turned on based on the scan signal SCAN from the gate line GL. In programming for display driving, the eighth switch element ST8 may be turned on and may apply the reference voltage charged into the readout line SIO to the eighth node N8. In leakage current detection driving, the eighth switch element ST8 may be turned on and may vary a voltage of the readout line SIO by a voltage of the eighth node N8 based on a leakage current. A gate electrode of the eighth switch element ST8 may be connected to the gate line GL, a drain electrode thereof may be connected to the eighth node N8, and a source electrode thereof may be connected to a drain electrode of the fourth monitoring element MT4.

The fourth monitoring element MT4 may connect the source electrode of the eighth switching element ST8 to the readout line SIO, based on a fourth monitoring signal MS4. The fourth subpixel SP4 may be exclusively connected to the readout line SIO by the fourth monitoring element MT4, and thus, the leakage of the fourth driving element DT4 may be accurately detected.

A gate electrode of the fourth monitoring element MT4 may be connected to a fourth monitoring line ML4, a drain electrode thereof may be connected to the source electrode of the eighth switch element ST8, and a source electrode thereof may be connected to the readout line SIO.

The fourth storage capacitor Cst4 may be connected between the seventh node N7 and the eighth node N8 and may store a gate-source voltage of the fourth driving element DT4.

As described above, the four subpixels SP1 to SP4 may share one readout line SIO so as to share a leakage current. Accordingly, in order to prevent the mixture of sensing values, leakage current detection driving on the four subpixels SP1 to SP4 may be performed at different times.

Figure 3:
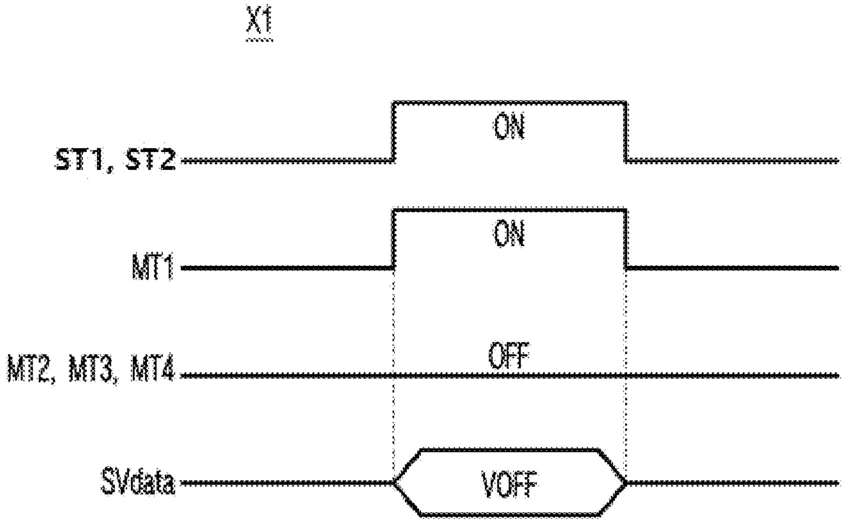
FIG. 3 is a driving waveform diagram of four subpixels during a first detection period.
Figure 4:
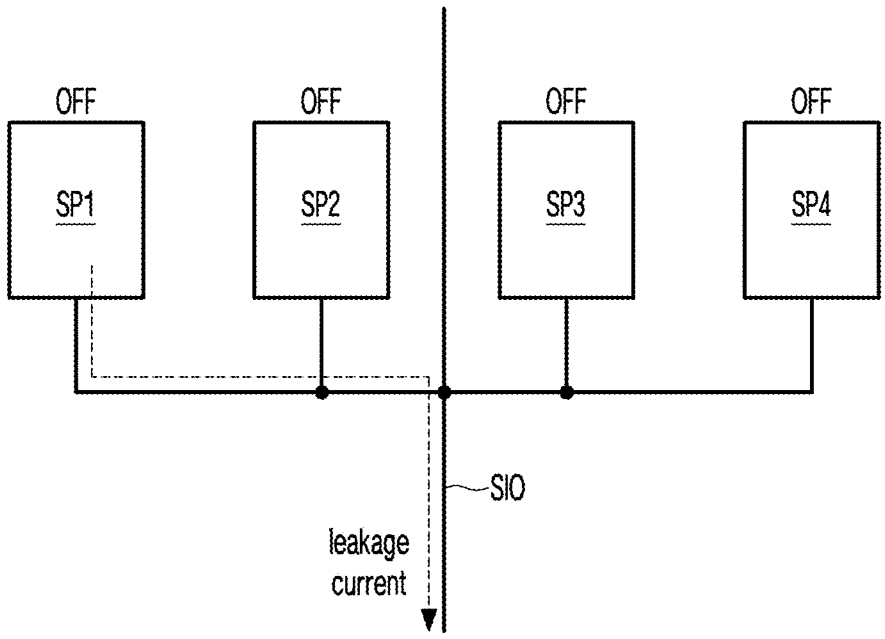
FIG. 4 is a diagram illustrating a leakage current detection path with respect to only a first subpixel during the first detection period.

FIG. 3 is a driving waveform diagram of four subpixels during a first detection period. FIG. 4 is a diagram illustrating a leakage current detection path with respect to only a first subpixel during the first detection period.

As shown in FIGS. 3 and 4, in a first detection period X1, all of switch elements ST1 to ST8 included in subpixels (for example, first to fourth subpixels) SP1 to SP4 may be turned on in response to a scan signal SCAN, and thus, a detection data voltage SVdata having an off level VOFF may be applied to gate electrodes of driving elements (for example, first to fourth driving elements) DT1 to DT4. In the first detection period X1, all of the subpixels SP1 to SP4 may be in an off state.

During the first detection period X1, leakage current detection driving may be exclusively performed on the first subpixel SP1. To this end, during the first detection period X1, a first monitoring element MT1 may be turned on, and second to fourth monitoring elements MT2 to MT4 may be turned off. When a leakage defect occurs in the first driving element DT1 included in the first subpixel SP1, a voltage of a readout line SIO may vary by a leakage current. A sensing circuit may detect the voltage of the readout line SIO to determine whether the leakage of the first driving element DT1 included in the first subpixel SP1 occurs.

Figure 5:
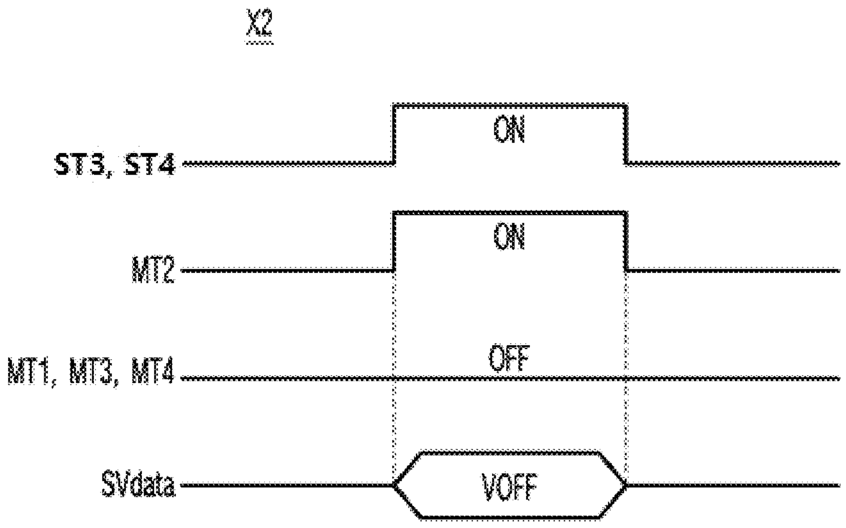
FIG. 5 is a driving waveform diagram of four subpixels during a second detection period.
Figure 6:
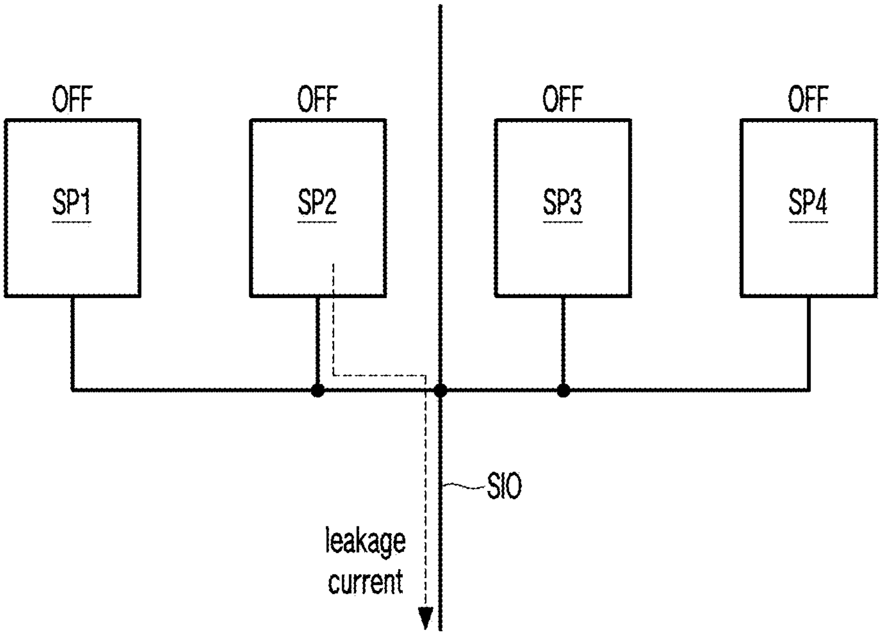
FIG. 6 is a diagram illustrating a leakage current detection path with respect to only a second subpixel during the second detection period.

FIG. 5 is a driving waveform diagram of four subpixels during a second detection period. FIG. 6 is a diagram illustrating a leakage current detection path with respect to only a second subpixel during the second detection period.

As shown in FIGS. 5 and 6, in a second detection period X2, all of switch elements ST1 to ST8 included in subpixels (for example, first to fourth subpixels) SP1 to SP4 may be turned on in response to a scan signal SCAN, and thus, a detection data voltage SVdata having an off level VOFF may be applied to gate electrodes of driving elements (for example, first to fourth driving elements) DT1 to DT4. In the second detection period X2, all of the subpixels SP1 to SP4 may be in an off state.

During the second detection period X2, leakage current detection driving may be exclusively performed on the second subpixel SP2. To this end, during the second detection period X2, a second monitoring element MT2 may be turned on, and first, third, and fourth monitoring elements MT1, MT3, and MT4 may be turned off. When a leakage defect occurs in the second driving element DT2 included in the second subpixel SP2, a voltage of a readout line SIO may vary by a leakage current. A sensing circuit may detect the voltage of the readout line SIO to determine whether the leakage of the second driving element DT2 included in the second subpixel SP2 occurs.

Figure 7:
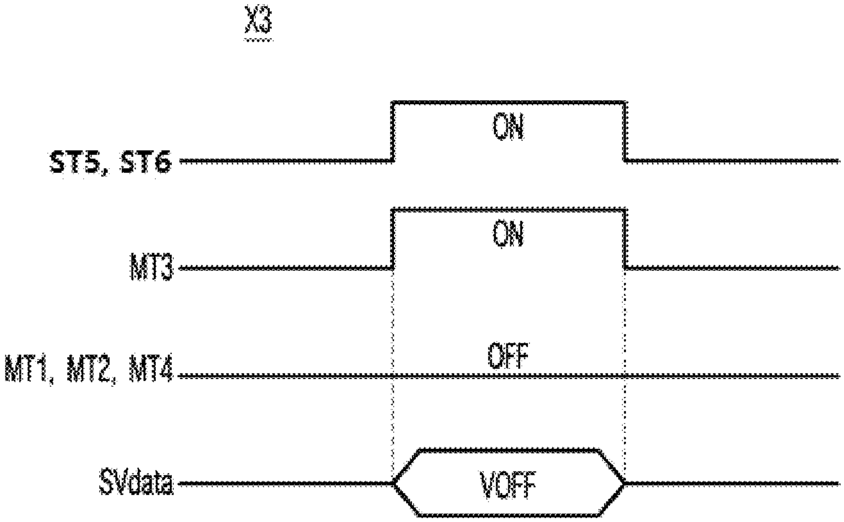
FIG. 7 is a driving waveform diagram of four subpixels during a third detection period.
Figure 8:
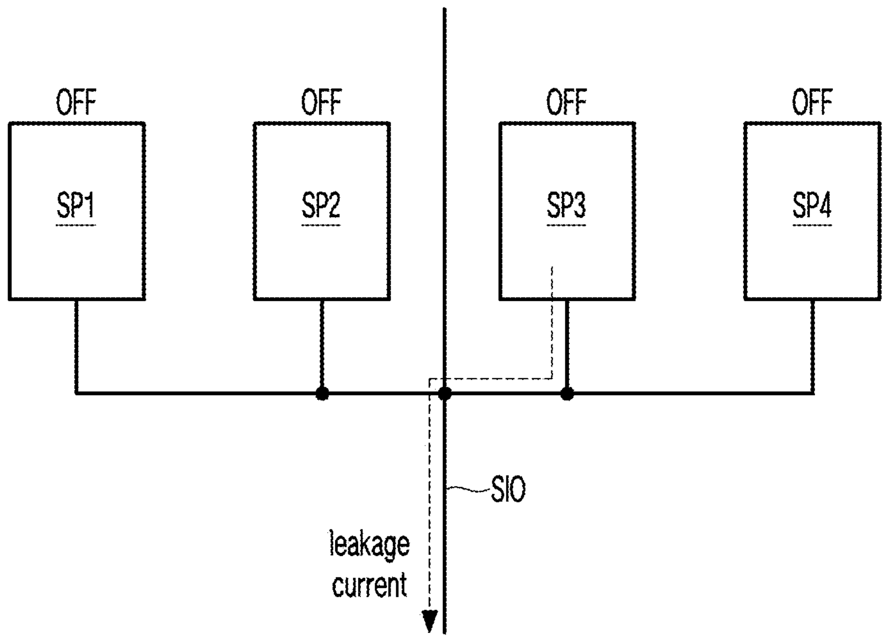
FIG. 8 is a diagram illustrating a leakage current detection path with respect to only a third subpixel during the third detection period.

FIG. 7 is a driving waveform diagram of four subpixels during a third detection period. FIG. 8 is a diagram illustrating a leakage current detection path with respect to only a third subpixel during the third detection period.

As shown in FIGS. 7 and 8, in a third detection period X3, all of switch elements ST1 to ST8 included in subpixels (for example, first to fourth subpixels) SP1 to SP4 may be turned on in response to a scan signal SCAN, and thus, a detection data voltage SVdata having an off level VOFF may be applied to gate electrodes of driving elements (for example, first to fourth driving elements) DT1 to DT4. In the third detection period X3, all of the subpixels SP1 to SP4 may be in an off state.

During the third detection period X3, leakage current detection driving may be exclusively performed on the third subpixel SP3. To this end, during the third detection period X3, a third monitoring element MT3 may be turned on, and first, second, and fourth monitoring elements MT1, MT2, and MT4 may be turned off. When a leakage defect occurs in the third driving element DT3 included in the third subpixel SP3, a voltage of a readout line SIO may vary by a leakage current. A sensing circuit may detect the voltage of the readout line SIO to determine whether the leakage of the third driving element DT3 included in the third subpixel SP3 occurs.

Figure 9:
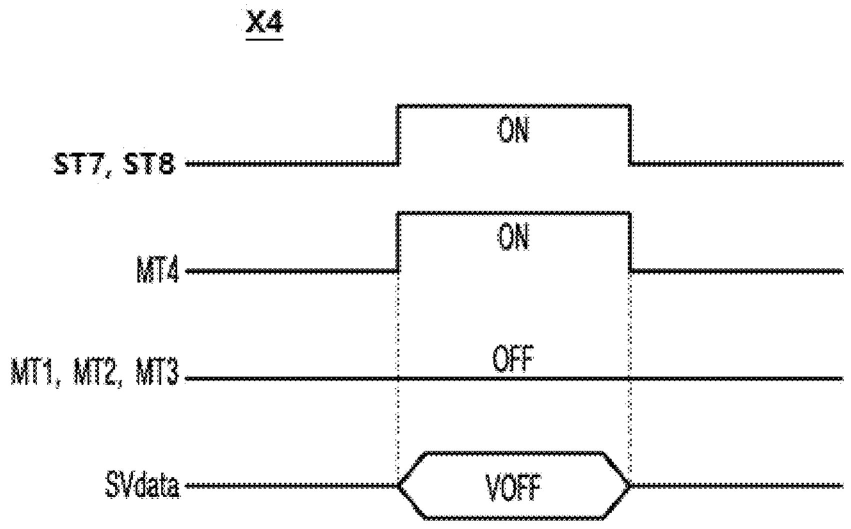
FIG. 9 is a driving waveform diagram of four subpixels during a fourth detection period.
Figure 10:
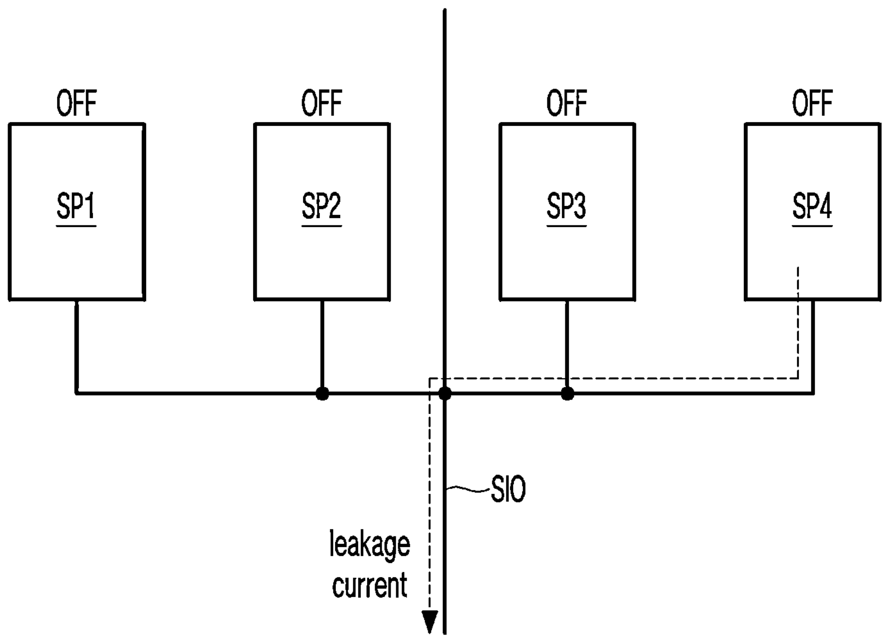
FIG. 10 is a diagram illustrating a leakage current detection path with respect to only a fourth subpixel during the fourth detection period.

FIG. 9 is a driving waveform diagram of four subpixels during a fourth detection period. FIG. 10 is a diagram illustrating a leakage current detection path with respect to only a fourth subpixel during the fourth detection period.

As shown in FIGS. 9 and 10, in a fourth detection period X4, all of switch elements ST1 to ST8 included in subpixels (for example, first to fourth subpixels) SP1 to SP4 may be turned on in response to a scan signal SCAN, and thus, a detection data voltage SVdata having an off level VOFF may be applied to gate electrodes of driving elements (for example, first to fourth driving elements) DT1 to DT4. In the fourth detection period X4, all of the subpixels SP1 to SP4 may be in an off state.

During the fourth detection period X4, leakage current detection driving may be exclusively performed on the fourth subpixel SP4. To this end, during the fourth detection period X4, a fourth monitoring element MT4 may be turned on, and first to third monitoring elements MT1 to MT3 may be turned off. When a leakage defect occurs in the fourth driving element DT4 included in the fourth subpixel SP4, a voltage of a readout line SIO may vary by a leakage current. A sensing circuit may detect the voltage of the readout line SIO to determine whether the leakage of the fourth driving element DT4 included in the fourth subpixel SP4 occurs.

Embodiments of the present disclosure may realize the following effect.

Embodiments of the present disclosure may accurately detect whether the leakage of a driving element included in each subpixel occurs, in a pixel connection structure where a plurality of subpixels share the same readout line.

The advantages and effects according to the present disclosure are not limited to those described above, and additional advantages and effects are included in or may be obtained from the present disclosure.

While the present disclosure has been particularly shown and described with reference to example embodiments thereof, it will be understood by those of ordinary skill in the art that various changes in form and details may be made therein without departing from the spirit and scope of the present disclosure. Therefore, the above example embodiments of the present disclosure are provided for illustrative purposes and are not intended to limit the scope or technical concept of the present disclosure. The protective scope of the present disclosure should be construed based on the following claims and their equivalents, and it is intended that the present disclosure cover all modifications and variations of this disclosure that come within the scope of the claims and their equivalents.

What is claimed is:

1. An electroluminescent display apparatus, comprising:

a first subpixel circuit including:

a first driving element including a gate electrode connected to a first node and a source electrode connected to a second node;

a first light emitting device connected to the second node;

a first switch element configured to connect the first node to a first data line charged with a detection data voltage according to a scan signal;

a second switch element having an electrode connected to the second node and configured to turn on based on the scan signal; and a first monitoring element configured to connect a readout line to another electrode of the second switch element according to a first monitoring signal;

a gate driver configured to supply the scan signal to a gate line connected to gate electrodes of the first and second switch elements and to supply the first monitoring signal to a first monitoring line connected to a gate electrode of the first monitoring element; and a sensing circuit configured to sense a voltage of the readout line in a first detection period where the first and second switch elements and the first monitoring element are turned on.

2. The electroluminescent display apparatus of claim 1, further comprising a second subpixel circuit including:

a second driving element including a gate electrode connected to a third node and a source electrode connected to a fourth node;

a second light emitting device connected to the fourth node;

a third switch element configured to connect the third node to a second data line charged with the detection data voltage according to the scan signal;

a fourth switch element having an electrode connected to the fourth node and configured to turn on based on the scan signal; and a second monitoring element configured to connect the readout line to another electrode of the fourth switch element according to a second monitoring signal, wherein gate electrodes of the third and fourth switch elements are further connected to the gate line, wherein the gate driver is further configured to supply the second monitoring signal to a second monitoring line connected to a gate electrode of the second monitoring element, and wherein the sensing circuit is further configured to sense a voltage of the readout line in a second detection period where the third and fourth switch elements and the second monitoring element are turned on.

3. The electroluminescent display apparatus of claim 2, further comprising a third subpixel circuit including:

a third driving element including a gate electrode connected to a fifth node and a source electrode connected to a sixth node;

a third light emitting device connected to the sixth node;

a fifth switch element configured to connect the fifth node to a third data line charged with the detection data voltage according to the scan signal;

a sixth switch element having an electrode connected to the sixth node and configured to turn on based on the scan signal; and a third monitoring element configured to connect the readout line to another electrode of the sixth switch element according to a third monitoring signal, wherein gate electrodes of the fifth and sixth switch elements are further connected to the gate line, wherein the gate driver is further configured to supply the third monitoring signal to a third monitoring line connected to a gate electrode of the third monitoring element, and wherein the sensing circuit is further configured to sense a voltage of the readout line in a third detection period where the fifth and sixth switch elements and the third monitoring element are turned on.

4. The electroluminescent display apparatus of claim 3, further comprising a fourth subpixel circuit including:

a fourth driving element including a gate electrode connected to a seventh node and a source electrode connected to an eighth node;

a fourth light emitting device connected to the eighth node;

a seventh switch element configured to connect the seventh node to a fourth data line charged with the detection data voltage according to the scan signal;

an eighth switch element having an electrode connected to the eighth node and configured to turn on based on the scan signal; and a fourth monitoring element configured to connect the readout line to another electrode of the eighth switch element according to a fourth monitoring signal, wherein gate electrodes of the seventh and eighth switch elements are further connected to the gate line, wherein the gate driver is further configured to supply the fourth monitoring signal to a fourth monitoring line connected to a gate electrode of the fourth monitoring element, and wherein the sensing circuit is further configured to sense a voltage of the readout line in a fourth detection period where the seventh and eighth switch elements and the fourth monitoring element are turned on.

5. The electroluminescent display apparatus of claim 4, wherein:

the first to fourth subpixel circuits share the readout line and the gate line; and the first to fourth detection periods are temporally separated from one another.

6. The electroluminescent display apparatus of claim 4, wherein, in the first to fourth monitoring elements:

only the first monitoring element is configured to be turned on in the first detection period;

only the second monitoring element is configured to be turned on in the second detection period;

only the third monitoring element is configured to be turned on in the third detection period; and only the fourth monitoring element is configured to be turned on in the fourth detection period.

7. The electroluminescent display apparatus of claim 4, wherein the detection data voltage is a voltage for turning off the first to fourth driving elements.

* * * * *